(12) United States Patent
Lisenker et al.

(10) Patent No.: US 11,542,161 B2
(45) Date of Patent: Jan. 3, 2023

(54) METHOD OF PREPARING A WATER-REACTIVE SULFIDE MATERIAL

(71) Applicant: Solid Power, Inc., Louisville, CO (US)

(72) Inventors: Ilya Lisenker, Boulder, CO (US); Sean Culver, Broomfield, CO (US)

(73) Assignee: Solid Power Operating, Inc., Louisville, CO (US)

( * ) Notice: Subject to any disclaimer, the term of this patent is extended or adjusted under 35 U.S.C. 154(b) by 136 days.

(21) Appl. No.: 17/177,988

(22) Filed: Feb. 17, 2021

(65) Prior Publication Data

US 2021/0253424 A1 Aug. 19, 2021

Related U.S. Application Data

(60) Provisional application No. 63/140,624, filed on Jan. 22, 2021, provisional application No. 62/977,505, filed on Feb. 17, 2020.

(51) Int. Cl.
*C01B 17/22* (2006.01)

(52) U.S. Cl.
CPC .......... *C01B 17/22* (2013.01); *C01P 2006/90* (2013.01)

(58) Field of Classification Search
CPC ..... C01P 2006/90; C01B 17/22; C01D 15/00; G01N 27/4112; H01M 61/18; H01M 4/86; H01M 4/5815
See application file for complete search history.

(56) References Cited

U.S. PATENT DOCUMENTS

| 4,465,746 A * | 8/1984 | Akridge .................... C03C 4/18 429/231.95 |
| 6,017,500 A | 1/2000 | Mehta |
| 2007/0196739 A1 * | 8/2007 | Seino ...................... C01B 17/36 423/566.2 |
| 2013/0196190 A1 | 8/2013 | Yamada et al. |

OTHER PUBLICATIONS

PCT Application No. PCT/US2021/018386, International Search Report and Written Opinion, dated May 8, 2021, 14 pages.

* cited by examiner

*Primary Examiner* — Timothy C Vanoy
(74) *Attorney, Agent, or Firm* — Polsinelli PC; Gregory P. Durbin

(57) ABSTRACT

A process for producing a low-cost water-reactive metal sulfide material includes dissolving a substantially anhydrous alkali metal salt and a substantially anhydrous sulfide compound in a substantially anhydrous polar solvent, providing differential solubility for a substantially high solubility alkali metal sulfide and a substantially low solubility by-product, and forming a mixture of the high solubility alkali metal sulfide and the low solubility by-product; separating the low solubility by-product from the mixture to isolate the supernatant including the alkali metal sulfide, and separating the polar solvent from the alkali metal sulfide to produce the alkali metal sulfide. The present invention provides a scalable process for production of a high purity alkali metal sulfide that is essentially free of undesired by-products.

34 Claims, 4 Drawing Sheets

METHOD OF PREPARING A WATER-REACTIVE SULFIDE MATERIAL

RELATED APPLICATIONS

This application claims priority to U.S. Provisional Patent Application No. 62/977,505, filed Feb. 17, 2020, and U.S. Provisional Patent Application No. 63/140,624, filed Jan. 22, 2021, which are incorporated herein by reference in its entirety into this disclosure.

FIELD

Various embodiments described herein relate to the field of manufacturing alkali metal sulfide compounds which may be used for solid-state primary and secondary electrochemical cells, electrodes and electrode materials, electrolyte and electrolyte compositions.

SUMMARY

In an embodiment, a method for producing a water-reactive metal sulfide compound comprises the steps of: dissolving a substantially anhydrous alkali metal salt and a substantially anhydrous sulfide compound in a polar organic solvent providing differential solubility for a high solubility alkali metal sulfide and a low solubility by-product and forming an anhydrous solution; causing a chemical reaction that forms a supernatant of the high solubility alkali metal sulfide dissolved in the polar solvent, and a precipitate of the low solubility by-product; separating the low solubility by-product from the supernatant, evaporating the polar solvent from the supernatant, and performing a final heat treatment to isolate the alkali metal sulfide.

BRIEF DESCRIPTION OF DRAWINGS

The present disclosure may be understood by reference to the following detailed description taken in conjunction with the drawings briefly described below.

DETAILED DESCRIPTION OF ILLUSTRATED EMBODIMENTS

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes, devices, and systems finding application in the various embodiments described herein are not disclosed in detail.

Alkali metal sulfides, such as lithium sulfide—$Li_2S$, are an important class of materials useful for solid-state primary and secondary electrochemical cells, electrodes and electrode materials, electrolyte and electrolyte compositions and ultimately larger systems utilizing such components such as computers, drones and electric vehicles. The most common uses for $Li_2S$ today are as a precursor material for the production of sulfide solid-state electrolytes and as an active cathode material for lithium sulfur batteries. To support continued growing use of alkali metal sulfides, the present disclosure describes advances to produce alkali metal sulfides at higher purity but at lower cost using scalable processes. The process described herein enables low-cost, high-purity metal sulfides, such as $Li_2S$, which will enable cost-effective sulfide-based solid electrolytes, solid-state batteries, and solid-state-battery-powered vehicles for the first time.

The reactive and ionic alkali metal sulfides are commonly not present as naturally-occurring minerals due to their solubility and tendency to hydrolyze spontaneously. Multiple methods for synthesizing alkali metal sulfides are known but commonly result in variable purity and composition, or utilize expensive and toxic materials and complex processing. Known methods include: reducing alkali metal sulfates with organic compounds, carbon, or hydrogen in the inert or reducing atmospheres (Mellor, *A Comprehensive Treatise on Inorganic and Theoretical Chemistry*). This method suffers from the difficulty in avoiding unreacted products due to poor mixing and separating the excess carbon without hydrolyzing the product. Smith (U.S. Pat. No. 3,642,436) teaches reacting alkali metals with hydrogen sulfide or sulfur vapor, but this method requires relatively expensive Li metal and requires handling large quantities of hydrogen sulfide which is a highly toxic and flammable gas. Mehta (U.S. Pat. No. 6,555,078) teaches reacting lithium salts with a sodium salt of a desired anion in an aqueous or semi-aqueous solution, but this process is not appropriate for the water-reactive alkali metal sulfides as it would lead to partial hydrolysis of the resultant material. Barker (U.S. Pat. No. 8,377,411) teaches a high temperature synthesis using sulfur vapor to reduce alkali metal carbonates or hydroxides. One drawback of this method is corrosion of processing equipment at the high temperatures required. Dawidowski (DE102012208982) teaches reacting a lithium metal base with hydrogen sulfide in an organic solvent, but this method employs expensive lithium organic compounds as precursors.

The present invention presents a process for producing a water-reactive metal sulfide material by dissolving a substantially anhydrous alkali metal salt and a substantially anhydrous sulfide precursor compound in a substantially anhydrous organic polar solvent, providing differential solubility for a substantially high solubility alkali metal sulfide and a substantially low solubility by-product, and forming a mixture of the high solubility alkali metal sulfide and the low solubility by-product; separating the low solubility by-product from the mixture to isolate the supernatant including the alkali metal sulfide, and separating the polar solvent from the alkali metal sulfide to produce the alkali metal sulfide that is essentially free from hydrolyzed alkali metal by-products. The present invention provides a low-cost and scalable process for production of a high purity alkali metal sulfide or a material comprising an alkali metal sulfide and an alkali metal salt.

In the process of the current invention the alkali metal salts may include, but are not limited to, LiCl, and sulfide precursor compounds may include, but are not limited to, $K_2S$ and $Na_2S$. In an exemplary process for producing $Li_2S$, LiCl and $Na_2S$ are used with NaCl as the by-product; however, any sulfide of a monovalent cation that is soluble in the polar solvent can be used in place of $Na_2S$ as long as the corresponding by-product chloride has low solubility.

The alkali metal salts and the sulfide compounds may generally be in powder forms for easier dissolution. Ball milling or other processes may be used to reduce particles' size to those suitable for the process. The alkali metal salts and the sulfide compounds are substantially anhydrous, with water content in the range of 0% to 5% by weight, preferably less than 1% by weight, more preferably less than 0.1% by weight, and most preferably less than 200 ppm, without adversely impacting the current invention. Similarly, the polar organic solvent should be substantially anhydrous, with water content in the range of 0% to 5% by weight, preferably less than 1% by weight, more preferably less than 0.1% by weight, and most preferably less than 200 ppm. The degree of hydration may impact hydrolyzation, add complexity to precipitation and separating steps and reduce resultant alkali metal sulfide purity. For example, a desirable alkali metal sulfide $Li_2S$ is very soluble in water and hydrolyses to LiOH and $H_2S$ which complicates purification and extraction of by-products. Heated drying or vacuum processing may be used to reduce the hydration of the precursor materials prior to use. Furthermore, processing under inert gas and anhydrous and/or vacuum conditions may maintain the degree of hydration through the various process steps.

Powders of the alkali metal salts and sulfide compounds may be individually or jointly added to the polar solvent. Powders may alternatively be mixed together prior to being added to the polar solvent or each/either may be independently dissolved into solution prior to adding the other material into the combined solution. The exact morphology is not limited to powders and may present itself as flakes, granules, or even coarser morphologies. Exemplary solvents may include, for example, but are not limited to, alcohols such as ethanol, 1-propanol, and 1-butanol. The solvent is not particularly limited as long as it provides sufficient differential solubility for a high solubility alkali metal sulfide and a low solubility by-product and does not participate in deleterious side reactions with alkali metal salt, the sulfide compound, the alkali metal sulfide and/or the by-products. For example, ratio of solubility of $Li_2S$ to NaCl in Ethanol is at least 97:3, in 1-Propanol it is at least 99:1, and in 1-Butanol it is at least 99.9:0.1. In certain examples, discussed below, neither $Na_2S$ nor $Li_2S$ react with the polar solvent to a significant extent and by-product NaCl has a substantially low solubility in the polar solvent relative to the alkali metal sulfide.

In one aspect, if the products of the reaction (alkali metal sulfide and by-product) have substantially similar solubility in the polar solvent, then the desired alkali metal sulfide product will be difficult to purify. In another aspect, if the processing temperature is too high, there may be more undesirable side reactions between the precursors and the solvents used. In another aspect, if the processing temperature is too low, the solubility of the precursors and the alkali metal sulfide may be too low to produce the desired yield.

The ratios and amounts of the various precursor materials and the polar solvent is not specifically limited as long as the combination permits the synthesis of the desired alkali metal sulfide. The ratios and amounts may also vary according to specific synthesis conditions. For example, the ratio of solvent volume to individual precursor amounts may need to be adjusted to offset side reactions or to adjust a desired purity of the resultant alkali metal sulfide. The amount of solvent used in the synthesis is not limited as long as the amount supports synthesis of the desired alkali metal sulfide. Furthermore, multiple solvents may be mixed together with the noted compounds. For example, non-polar denaturing agents, such as heptane, may be present in the alcohol as long as they do not interfere with the process by affecting solubilities. Additional materials, such as co-solvents or flocculant, may also be added during this step.

In another embodiment, to further improve the purity of the desired alkali metal sulfide, a sulfur source in the form of $H_2S$ or solid elemental sulfur may be introduced at any point during the process. The sulfur source can be partially or fully dissolved into the polar and or non-polar solvents prior to the addition of the alkali metal salt or the sulfide precursor material. The sulfur source can be added to the solution containing the alkali metal salt, to the solution containing the sulfide material or both. When elemental sulfur is used and is added to the solution containing the sulfide material, a polysulfide such as $Na_2S_x$, where X is greater than 1 but less than or equal to 10, may form. The polysulfide may have a greater solubility than the non-polysulfide version of the material ($Na_2S_5$ vs $Na_2S$). With an increased solubility, a lesser amount of the polar solvent may be used to reach the desired dissolution when compared to using its non-polysulfide counterpart. When elemental sulfur is present during the metathesis reaction, the elemental sulfur can form a polysulfide with the newly formed sulfide material such as, but not limited to, $Li_2S_x$, or $LiHS_x$. The polysulfide formed at this stage may have a greater solubility than its sulfide counterpart ($Li_2S_8$ vs $Li_2S$) and thus provide a greater solubility separation between the desired metal sulfide and the newly formed metal salt. Increasing the difference in solubility between the newly formed alkali metal sulfide and the undesired product allows for a reduction in the amount of polar solvent and the amount of a non-polar anti-solvent needed to produce the desired results.

The by-product may naturally precipitate from the solution at near room temperature, 25° C., to form a supernatant containing the high solubility alkali metal sulfide and a precipitate of the low solubility by-product. Adjustment of temperature, specifically cooling, may be used to alter the precipitation rate or to drive additional precipitation of the low solubility by-product. Stirring or other mixing may be used to homogenize the solution and mixing time is not specifically limited as long as it allows for appropriate homogenization and reaction of precursors to generate the alkali metal sulfide and the by-product. Mixing temperature is not specifically limited as long as it allows for appropriate mixing and is not so high or so low as to suppress the solubility of the alkali metal sulfide. For example, appropriate mixing may be accomplished at temperatures from −50 to 120 degrees Celsius using, for example, magnetic stirrers or a shaft mixer. This can be carried out as a batch process or as a continuous process aided by rapid reaction kinetics. Additionally, a desired amount of an anti-solvent such as heptane or other aprotic chain hydrocarbons may be added to the solution to drive additional precipitation of the low solubility by-product. The anti-solvent used should be substantially miscible in the range of 7:1 v/v Non-polar/Alcohol to 1:2 v/v Non-polar/Alcohol, preferably at least 3:1 v/v Non-polar/Alcohol without affecting the solubility of the alkali metal sulfide. Alternatively, adding an additional quantity of an ionic compound such as LiCl to the polar solvent solution may further lower the solubility of a by-product such as NaCl, thereby replacing the need for an anti-solvent. The total amount of LiCl or other alkali metal salt precursor can be 150% to 85% of stoichiometric in order to improve product purity and/or include some amount of the alkali metal salt with the final alkali metal sulfide. For example, a material product that combines well-mixed $Li_2S$ and LiCl is useful as a precursor for producing sulfide solid electrolytes comprising Li, S, and Cl.

A separation method such as centrifuging, filtering, or gravity settling may be used separately or in combination for separating the low solubility by-product from the mixture to isolate the supernatant containing the high solubility alkali metal sulfide. In some embodiments, filtering may be performed after the initial metathesis followed by treatment of the resultant solution/suspension with a larger quantity of antisolvent and an additional filtration. Additionally, separation such as filtration may be performed on a chilled solution.

Separation of the polar solvent from the supernatant to isolate the alkali metal sulfide that is essentially free from hydrolyzed alkali metal by-products may be achieved by evaporating the polar solvent, recrystallization, and/or heating under vacuum. It may be noted that said material may appear dry at this stage but may contain solvent that makes up 75% the total weight. It may be beneficial to utilize solvents with low heat of evaporation that use less energy to remove. Furthermore, solvents may be recycled and reused.

After isolation of the targeted alkali metal sulfide, the remaining bound solvent may be removed by heating in an inert atmosphere such as argon or nitrogen or under vacuum for a predetermined period of time and temperature prior to storage or use. The temperature range is not limited and for example can be in the range of 25° C. to 900° C., more preferably 200° C. to 700° C., most preferably 350° C. to 500° C.

In another embodiment, the introduction of a sulfur source can also occur any point during the drying or high-temperature treatment of the target alkali metal sulfide. Examples of such include, but are not limited to, evaporating the solvents at elevated temperature under vacuum and introducing elemental sulfur by means of mixing, blending, or grinding the sulfur into the newly dried alkali metal sulfide material. The amount of sulfur added can be 100% or less the weight of the alkali metal sulfide, more preferably 50% or less the weight of the alkali metal sulfide, more preferably, 10% or less the weight of the alkali metal sulfide, more preferably, 7% or less the weight of the alkali metal sulfide, and most preferably 5% or less the weight of the alkali metal sulfide. The composite comprising sulfur and the alkali metal sulfide can then be heated to the desired temperatures where the sulfur melts or sublimates, aiding in the removal of solvents and converting any oxygen-containing compounds to metal sulfides.

For purpose of this disclosure, the term "substantially" means at a state that is near 100% (including 100%) of a certain parameter. By way of example, near 100% may span a range from around 80% to 100%, from around 90% to 100%, or from around 95% to 100%.

Generally, the process of the current invention provides a low-cost synthesis of a metal sulfide by allowing an alkali metal sulfide and a metal salt to dissolve in an aliphatic alcohol and/or like solvents in which a "double ion exchange" occurs. The end result is the synthesis of the desired metal sulfide and one or more by-products that can be filtered out either by the appropriate selection of solvent or by adding an anti-solvent such as but not limited to a non-polar hydrocarbon then filtering out the undesirable product(s). The solvent(s) are then removed, leaving the metal sulfide of desired purity as a product. The general reaction may be defined by:

Specifically for the production of $Li_2S$ and including an anti-solvent:

Using Ethanol (EtOH):

Using 1-Propanol (PrOH) or an (straight chain) alcohol with a longer carbon chain than Ethanol:

Where;
Z=Li, Na, K, Mg, Ca, $NH_4$
X=F, Cl, Br, I, $SO_4$, $SO_3$, $NO_3$, $NO_2$
Y=Li, Na, K, Ca, Mg, Ba, Zn, Al, Cd, Si, Ge, Fe
n=The valence charge of S multiplied by w all divided by the valence charge of Z
m=The valence charge of X multiplied by p all divided by the valence charge of Y
p=The valence charge of Y multiplied by m all divided by the valence charge of X
w=The valence charge of Z multiplied by n all divided by the valence charge of S
R=between 1 and 10 carbons

EXAMPLES

The disclosure will now be illustrated with working examples, and which is intended to illustrate the working of disclosure and not intended to restrict any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Example 1

Figure 1:
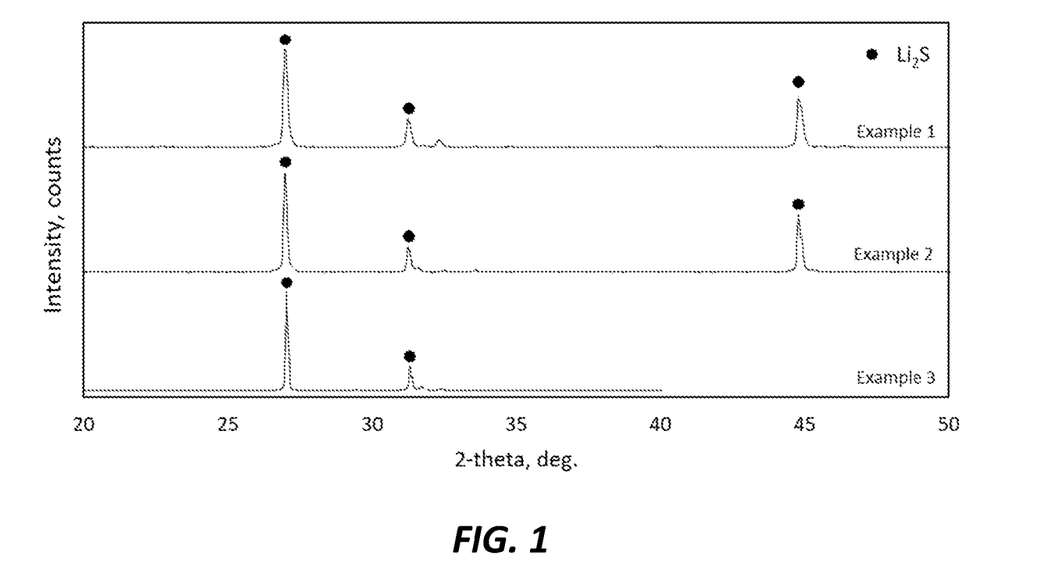
FIG. 1 refers to x-ray diffractograms of the lithium sulfide ($Li_2S$) synthesized in examples 1, 2 and 3.

1.0 gram anhydrous $Na_2S$ was dissolved in 16 grams of anhydrous ethanol, with less than 50 ppm water and, separately, approximately 1.09 gram of anhydrous LiCl—the stoichiometric quantity—was dissolved in 6 grams of anhydrous ethanol, with less than 50 ppm water. The LiCl solution was then metered into the continuously stirred $Na_2S$ solution. Near room temperature (25° C.), precipitation occurred immediately. The mixture was chilled to −25° C. then centrifuged for 10 minutes at 4000 rpm in order to separate the supernatant, which was largely $Li_2S$ in alcohol at this point, and remove the insoluble NaCl byproduct. At this point, the majority of the alcohol was removed from the supernatant using a rotary evaporator at 200° C. under vacuum. At this stage, the material was apparently dry but contained approximately 15% bound solvent. The product was further heat treated at 400° C. under argon for 1 hour. This step served to remove remaining solvent and sinter the $Li_2S$ to the micro-scale. The resultant alkali metal sulfide had a purity of approximately 87%, and the main impurity was lithium oxychloride $Li_3ClO$ with the highest intensity XRD peak at approximately 32.3°. Sodium chloride byproduct was present at approximately 1.5%– below room temperature solubility due to chilling.

Example 2

1.0 gram anhydrous $Na_2S$ was dissolved in 16 grams of anhydrous ethanol, with less than 50 ppm water and, separately, approximately 1.06 gram of anhydrous LiCl—a quantity 2.5% deficient to stoichiometric—was dissolved in 6 grams of anhydrous ethanol, with less than 50 ppm water. The LiCl solution was then metered into the continuously stirred $Na_2S$ solution. Near room temperature (25° C.), precipitation occurred immediately. The mixture was chilled to −25° C. then centrifuged for 10 minutes at 4000 rpm in order to separate the supernatant, which was largely $Li_2S$ in alcohol at this point, and remove the insoluble NaCl byproduct. At this point, the majority of alcohol was removed from the supernatant using a rotary evaporator at 200° C. under vacuum. At this stage, the material was apparently dry but contained approximately 15% bound solvent. The product was further heat treated at 400° C. under argon for 1 hour. This step served to remove remaining solvent and sinter the $Li_2S$ to the micro-scale. The resultant alkali metal sulfide had a purity of approximately 89% and the main impurity was lithium oxide $Li_2O$ with the highest intensity XRD peak at approximately 33.5°. Sodium chloride byproduct was present at approximately 2.1%. Notably, the amount of lithium oxychloride was reduced from 7.7% to 1.5% compared to the stoichiometric synthesis.

Example 3

1.0 gram anhydrous $Na_2S$ was dissolved in 16 grams of anhydrous ethanol and, separately, approximately 1.1 gram of anhydrous LiCl was dissolved in 6 grams of anhydrous ethanol. The LiCl solution was then metered into the continuously stirred $Na_2S$ solution. Near room temperature (25° C.), precipitation occurred immediately. Despite the low solubility of NaCl in ethanol, approximately 10 wt. % of the product at this stage was NaCl due to supersaturation. To the recovered supernatant, 60 grams of heptane was added as the antisolvent, resulting in a turbid suspension, which was centrifuged at 2000 rpm for 30 minutes in order to separate the supernatant, which was largely $Li_2S$ in alcohol at this point, and remove the insoluble NaCl by-product. At this point, the solvents were removed from the supernatant using a rotary evaporator at 200° C. under vacuum. Once the majority of the solvent was removed, the product was further heat treated at 400° C. under argon for 1 h. This step served to fully dry the product and sinter the $Li_2S$ to the micro-scale. The resultant alkali metal sulfide had a purity greater than 95%.

Example 4

Figure 2:
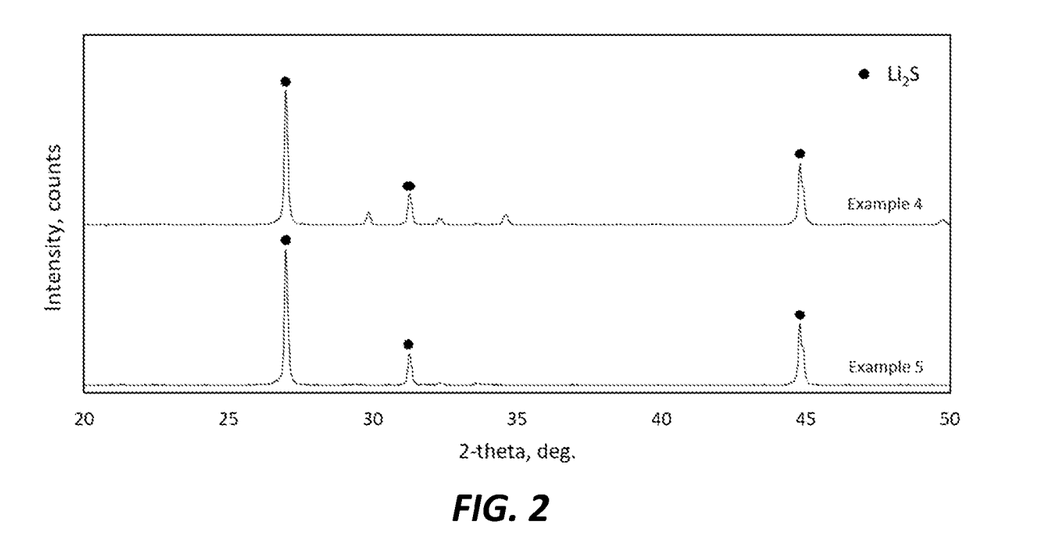
FIG. 2 refers to x-ray diffractograms of the lithium sulfide ($Li_2S$) synthesized in examples 4 and 5.

1.0 gram anhydrous $Na_2S$ was dissolved in 14 grams of anhydrous 1-propanol and, separately, approximately 1.1 gram of anhydrous LiCl was dissolved in 10 grams of anhydrous 1-propanol. The LiCl solution was then metered into the continuously stirred $Na_2S$ solution. Near room temperature (25° C.), precipitation occurred immediately. The mixture was cooled to −25° C. and then centrifuged for 40 minutes at 4000 rpm in order to separate the supernatant, which was largely $Li_2S$ in alcohol at this point, and remove the insoluble NaCl byproduct. At this point, the alcohol was removed from the supernatant using a rotary evaporator at 200° C. under vacuum. At this stage, the material was apparently dry but contained approximately 30% bound solvent. Once the majority of the solvent had been removed, the product is further heat treated at 400° C. under argon for 1 hour. This step served to fully dry the product and sinter the $Li_2S$ to the micro-scale. The resultant alkali metal sulfide had a purity approximately 81%. The main impurities were lithium chloride with peaks at 30.1° and 34.8° and lithium oxychloride $Li_3ClO$ with the highest intensity XRD peak at approximately 32.3°. Sodium chloride byproduct was present at approximately 0.1%.

Example 5

1.0 gram anhydrous $Na_2S$ was dissolved in 14 grams of anhydrous 1-propanol and, separately, approximately 1.06 gram of anhydrous LiCl—a quantity 2.5% deficient to stoichiometric—was dissolved in 10 grams of anhydrous 1-propanol. The LiCl solution was then metered into the continuously stirred $Na_2S$ solution. Near room temperature (25° C.), precipitation occurred immediately. The mixture was cooled to −25° C. and then centrifuged for 40 minutes at 4000 rpm in order to separate the supernatant, which was largely $Li_2S$ in alcohol, and remove the insoluble NaCl byproduct. At this point, the majority of alcohol was removed from the supernatant using a rotary evaporator at 200° C. under vacuum. At this stage, the material was apparently dry but contained approximately 30% bound solvent. Once the majority of the solvent had been removed, the product was further heat treated at 400° C. under argon for 1 hour. This step served to fully dry the product and sinter the $Li_2S$ to the micro-scale. The resultant alkali metal sulfide had a purity approximately 90%. The main impurities were lithium oxide with the highest intensity XRD peak at approximately 33.5° and lithium carbonate $Li_2CO_3$. Sodium chloride byproduct was present at approximately 0.3%. Notably, the amount of lithium oxychloride was substantially reduced compared to the stoichiometric synthesis.

Example 6

Figure 3:
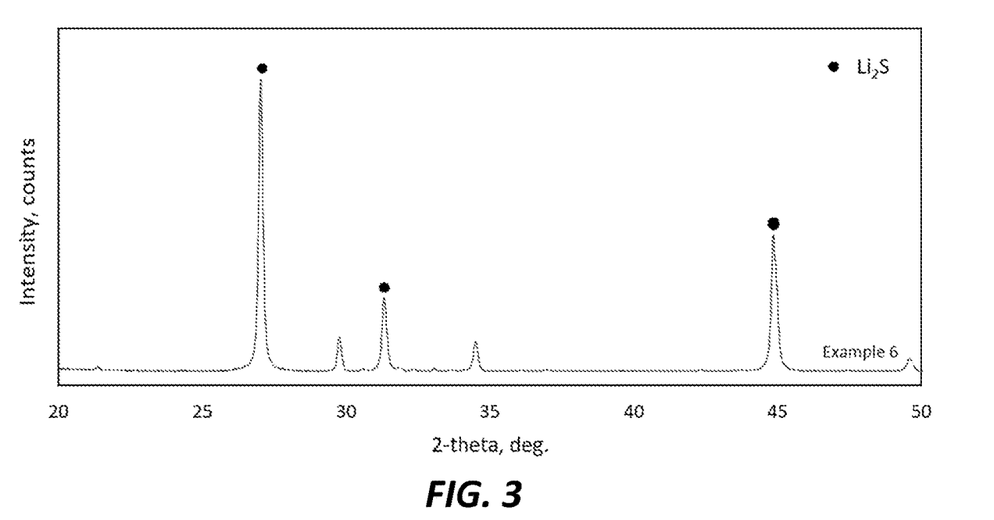
FIGS. 3 through 7 refer to x-ray diffractograms of the lithium sulfide ($Li_2S$) synthesized in examples 6 through 10, respectively.

1.0 gram anhydrous $Na_2S$ was dissolved in 19 grams of anhydrous 1-butanol and, separately, approximately 1.1 gram of anhydrous LiCl was dissolved in 13 grams of anhydrous 1-butanol. The LiCl solution was then metered into the continuously stirred $Na_2S$ solution. Near room temperature (25° C.), precipitation occurred immediately. The mixture was centrifuged for 50 minutes at 4000 rpm in order to separate the supernatant, which was largely $Li_2S$ in alcohol at this point, and remove the insoluble NaCl byproduct. At this point, the alcohol was removed from the supernatant using a rotary evaporator at 30° C. Once the majority of the solvent had been removed, the product was treated at 400° C. under argon for 1 hour. This step served to fully dry the product and sinter the $Li_2S$ to the micro-scale. The resultant alkali metal sulfide had a purity of approximately 90%. The main impurities were lithium oxide with the highest intensity XRD peak at approximately 33.5° and lithium carbonate $Li_2CO_3$. Sodium chloride byproduct was present at approximately 0.3%.

Example 7

Figure 4:
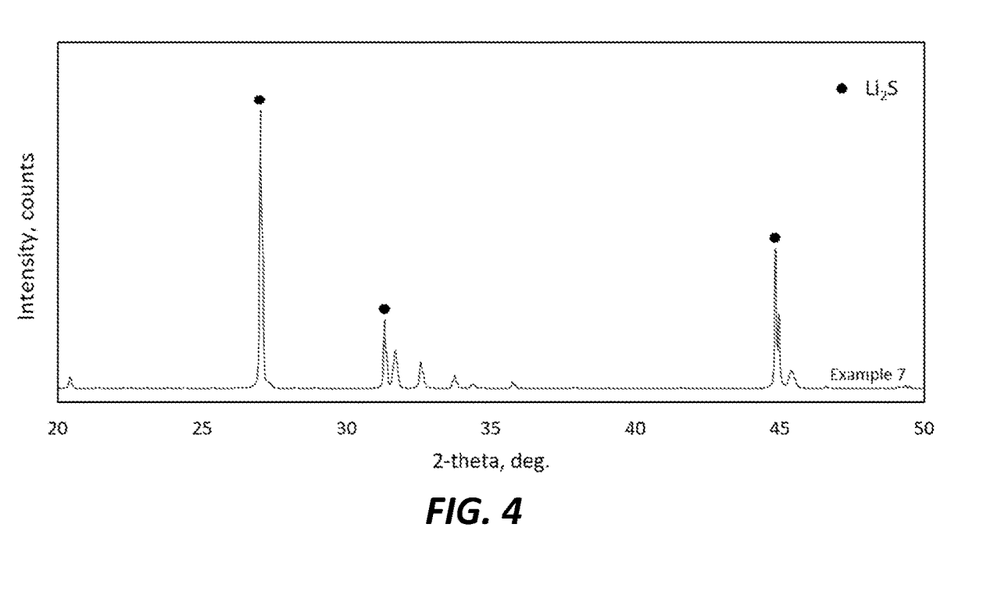

1.0 gram anhydrous $Na_2S$ was dissolved in 12 grams of mixture of 95.6% ethanol and 4.4% water. Dissolution was incomplete as some $Na_2S$ formed a hydrate insoluble in alcohol as disclosed in U.S. Pat. No. 2,838,374. Separately, approximately 1.09 gram of anhydrous LiCl was dissolved in 6 grams of 95.6% ethanol. The LiCl solution was then metered into the continuously stirred Na$_2$S solution. Near room temperature (25° C.), precipitation occurred immediately. The mixture was centrifuged for 10 minutes at 4000 rpm in order to separate the supernatant, which was largely Li$_2$S in alcohol at this point, and remove the insoluble NaCl byproduct. At this point, the majority of alcohol was removed from the supernatant using a rotary evaporator at 200° C. under vacuum. At this stage, the material was apparently dry but contained approximately 15% bound solvent. The product was further heat treated at 400° C. under argon for 1 hour. This step served to remove remaining solvent and sinter the Li$_2$S to the micro-scale. The resultant alkali metal sulfide had a purity of approximately 68% and the main impurities were 14% of lithium hydroxide, 8% of sodium chloride and 9% of lithium oxide.

Example 8

Figure 5:
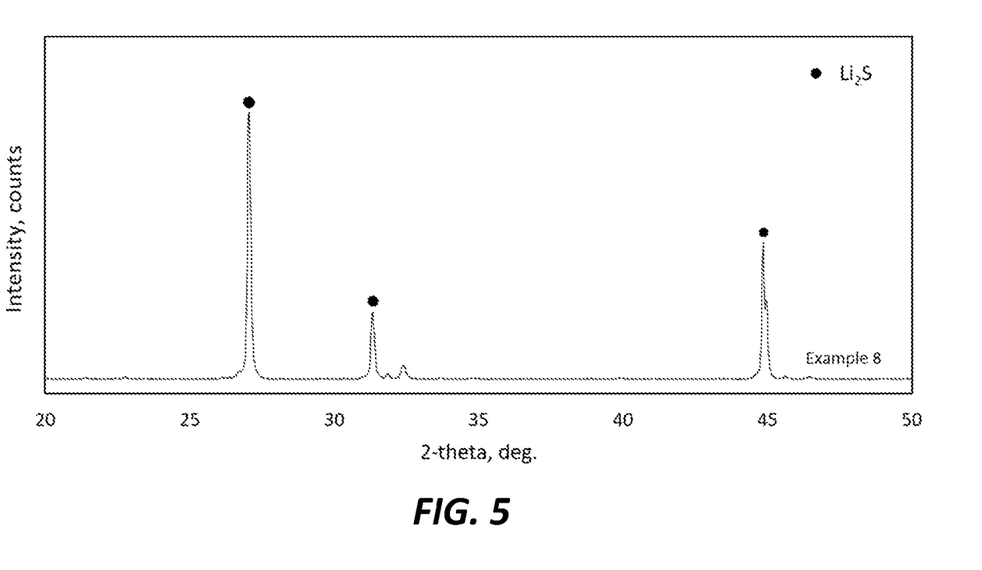

1.0 gram of anhydrous Na$_2$S was dissolved in 16 grams of anhydrous ethanol and approximately 1.1 gram of anhydrous LiCl was added to the Na$_2$S ethanol solution while continuously stirring the solution. Near room temperature (25° C.), the precipitation occurred immediately. The mixture was cooled to −25° C. and then centrifuged for 10 minutes at 4000 rpm in order to separate the supernatant, which was largely Li$_2$S in alcohol at this point, and remove the insoluble NaCl byproduct. At this point, the alcohol was removed from the supernatant using a rotary evaporator at 200° C. under vacuum. Once the product was dry, the mixture was heated to 400° C. under argon for 1 hour. The resultant alkali metal sulfide had a purity of about 90%. The main impurity was 5.7% of lithium oxychloride Li$_3$ClO with the highest intensity XRD peak at approximately 32.3°. Sodium chloride byproduct was present at approximately 1.3%.

Example 9

Figure 6:
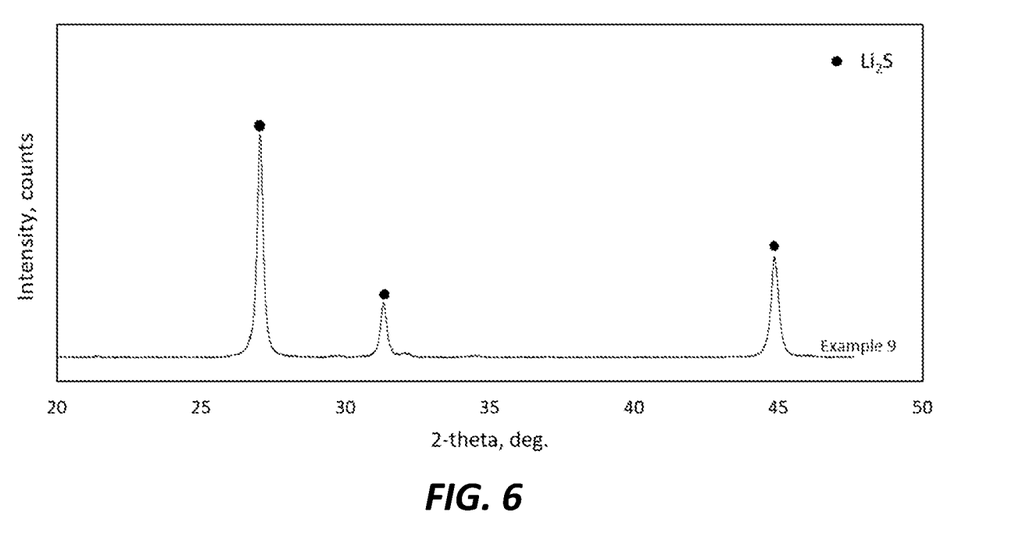

1.0 gram anhydrous Na$_2$S was dissolved in 10 grams of anhydrous ethanol, with less than 50 ppm water and, separately, approximately 1.06 gram of anhydrous LiCl—a quantity 2.5% deficient to stoichiometric—was dissolved in 6 grams of anhydrous ethanol, with less than 50 ppm water. The LiCl solution was then metered into the continuously stirred Na$_2$S solution. Near room temperature (25° C.), precipitation occurred immediately. The mixture was chilled to −25° C. then centrifuged for 10 minutes at 4000 rpm in order to separate the supernatant, which was largely Li$_2$S in alcohol at this point, and remove the insoluble NaCl byproduct. At this point, the majority of alcohol was removed from the supernatant using a rotary evaporator at 200° C. under vacuum. At this stage, the material was apparently dry but contained approximately 15% bound solvent. The product was blended with approximately 0.03 grams of elemental sulfur (5 wt %) using a mortar and pestle and then was further heat treated at 400° C. under argon for 1 hour. This step served to remove remaining solvent and reduce remaining impurities to sulfide. The resultant alkali metal sulfide had a purity of approximately 94% and the main impurity was lithium carbonate with the highest intensity XRD peak at approximately 31.8°. Sodium chloride byproduct was present at approximately 1.1%. Notably, the lithium oxychloride and lithium oxide were completely eliminated.

Example 10

Figure 7:
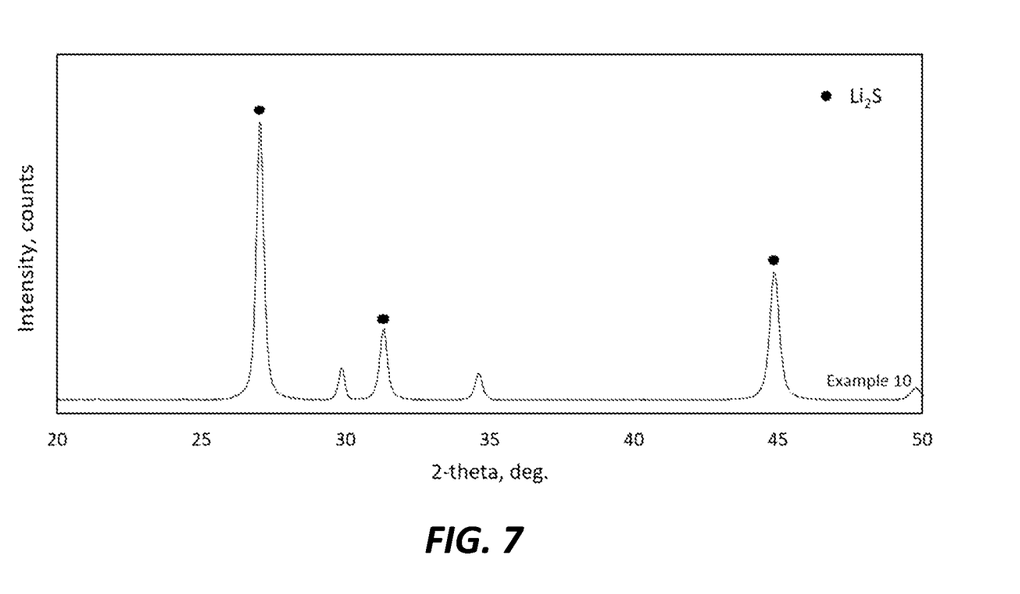

1.0 gram of anhydrous Na$_2$S mixed with 0.059 grams of elemental sulfur (10 wt % of expected Li$_2$S yield) was dissolved in 12 grams of anhydrous ethanol. The solution was yellow, indicating presence of polysulfides. Separately, approximately 1.2 gram of anhydrous LiCl—a quantity 10% in excess to stoichiometric—was dissolved in 6 grams of anhydrous ethanol. The LiCl solution was then metered into the continuously stirred Na$_2$S$_x$ solution. Near room temperature (25° C.), the precipitation occurred immediately. The mixture was then centrifuged for 10 minutes at 4000 rpm in order to separate the supernatant, which was largely Li$_2$S with excess of LiCl in alcohol at this point, and remove the insoluble NaCl byproduct. At this point, the alcohol was removed from the supernatant using a rotary evaporator at 200° C. under vacuum. Once a majority of the solvent had been removed and the products were dry the mixture was heated to 400° C. under argon for 1 hour. Polysulfides disproportionate into Li$_2$S and free sulfur that reduces existing impurities to more sulfide. The resultant alkali metal sulfide had a purity of 86%. The main impurity was the excess lithium chloride precursor with highest intensity XRD peaks at approximately 30.1° and 34.9°, that was present at approximately 10.9%.

Features described above as well as those claimed below may be combined in various ways without departing from the scope hereof. The previous examples illustrate some possible, non-limiting combinations. It should thus be noted that the matter contained in the above description or shown in the accompanying drawings should be interpreted as illustrative and not in a limiting sense. The above-described embodiments should be considered as examples of the present invention, rather than as limiting the scope of the various inventions. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions.

What is claimed is:

1. A method for producing a water-reactive alkali metal sulfide compound comprising:
   dissolving a substantially anhydrous alkali metal salt precursor and a substantially anhydrous sulfide precursor compound in one or more substantially anhydrous polar solvents, wherein the polar solvent provides differential solubility for a high solubility alkali metal sulfide and a low solubility by-product;
   forming a mixture comprising a supernatant of the high solubility alkali metal sulfide dissolved in the polar solvent, and a precipitate of the low solubility by-product;
   separating the precipitate of the low solubility by-product from the supernatant;
   evaporating the polar solvent from the supernatant; and a final heat treatment to isolate the alkali metal sulfide.

2. The method of claim 1, further comprising addition of a sulfur source at any point during the process to increase the purity of the final alkali metal sulfide product.

3. The method of claim 2, the sulfur source comprising one or more of elemental sulfur and H$_2$S.

4. The method of claim 2, wherein the sulfur source is added to one or more of the sulfide precursor solution, the alkali metal salt precursor solution, the combined sulfide and alkali metal salt mixture, and the isolated alkali metal sulfide prior to heat treatment.

5. The method of claim 2, wherein the isolated alkali metal sulfide material further comprises a $Li_3OCl$ phase which may be subsequently removed following the sulfur source addition and a subsequent heat treatment step.

6. The method of claim 1, further comprising introducing an anti-solvent compound to the supernatant of the high solubility alkali metal sulfide and the polar solvent, directly following the precipitation of the low solubility by-product.

7. The method of claim 6, wherein the anti-solvent is selected from one or more of heptane and other non-polar solvents with substantial miscibility in the polar solvent and which increases the differential solubility of the alkali metal sulfide versus the by-products.

8. The method of claim 1, wherein separating the low solubility by-product from the supernatant further comprises at least one of centrifuging, filtering, gravity settling, and cooling.

9. The method of claim 1, wherein separating the polar solvent from the supernatant further comprises at least one of evaporating the polar solvent, recrystallization, and heating under vacuum.

10. The method of claim 1, further comprising adjusting the relative amounts of the alkali metal salt precursor and the sulfide precursor compound added to the solution to adjust the purity of the resultant alkali metal sulfide.

11. The method of claim 10, wherein the resultant alkali metal sulfide material further comprises alkali metal salt precursor.

12. The method of claim 1, wherein the substantially anhydrous polar solvent is at least one alcohol selected from the group consisting of ethanol, 1-propanol, 1-butanol, ethanol denaturing agents and mixtures thereof.

13. The method of claim 1, wherein the alkali metal salt precursor is LiCl.

14. The method of claim 1, wherein the alkali metal salt precursor and the sulfide precursor compound are independently dissolved in the polar solvent prior to forming of a combined mixture.

15. The method of claim 1, wherein one of the alkali metal salt precursor and the sulfide precursor compound is dissolved in the polar solvent and the other is added to the solution in solid form.

16. The method of claim 1, wherein the ratio of the solubility of the alkali metal sulfide to the solubility of the by-product in the polar solvent is at least 90:10.

17. The method of claim 1, wherein the ratio of the solubility of the alkali metal sulfide to the solubility of the by-product in the polar solvent is at least 97:3.

18. The method of claim 1, wherein the ratio of the solubility of the alkali metal sulfide to the solubility of the by-product in the polar solvent is at least 99:1.

19. The method of claim 1, wherein the ratio of the solubility of the alkali metal sulfide to the solubility of the by-product in the polar solvent is at least 99.9:0.1.

20. The method of claim 1, wherein the sulfide precursor compound is selected from the group consisting of $K_2S$, $Na_2S$, and $(NH_4)_2S$.

21. The method of claim 1, wherein the alkali metal sulfide is $Li_2S$.

22. The method of claim 1, further comprising drying the resultant alkali metal sulfide.

23. A solid electrolyte comprising the water-reactive alkali metal sulfide produced by the method of claim 1.

24. The solid state electrolyte of claim 23, wherein the alkali metal sulfide is $Li_2S$.

25. A solid electrolyte comprising the material comprising alkali metal sulfide and alkali metal salt produced by the method of claim 11.

26. The solid state electrolyte of claim 25, wherein the alkali metal sulfide is $Li_2S$ and the alkali metal salt is one or more of LiCl and LiBr.

27. A solid state battery comprising the water-reactive alkali metal sulfide produced by the method of claim 1.

28. The solid state battery of claim 27, wherein the alkali metal sulfide is $Li_2S$.

29. A vehicle powered by a battery comprising the water-reactive alkali metal sulfide produced by the method of claim 1.

30. The vehicle of claim 29, wherein the alkali metal sulfide is $Li_2S$.

31. A method for producing lithium sulfide comprising:
dissolving substantially anhydrous LiCl and a substantially anhydrous sulfide compound selected from $Na_2S$ and $K_2S$ in a solvent selected from ethanol, 1-propanol and 1-butanol;
precipitating the solution to form a supernatant of high solubility $Li_2S$ alkali metal sulfide and the solvent, and a precipitate of low solubility chloride by-product;
separating the low solubility by-product from the supernatant; and
evaporating the solvent from the supernatant to isolate $Li_2S$.

32. The method of claim 31, further comprising the addition of a sulfur source.

33. The method of claim 32, the sulfur source comprising one or more of elemental sulfur and $H_2S$.

34. The method of claim 31, further comprising introducing an anti-solvent compound to the supernatant of the high solubility alkali metal sulfide and the polar solvent, directly following the precipitation of the low solubility by-product, wherein the anti-solvent is selected from one or more of heptane and other non-polar solvents with substantial miscibility in the polar solvent and which increases the differential solubility of the alkali metal sulfide versus the by-products.

* * * * *